United States Patent
Winner et al.

(10) Patent No.: US 8,291,409 B2
(45) Date of Patent: Oct. 16, 2012

(54) UPDATING VIRTUAL MACHINE WITH PATCH ON HOST THAT DOES NOT HAVE NETWORK ACCESS

(75) Inventors: Eric J. Winner, Woodinville, WA (US); Gilad Golan, Redmond, WA (US); Robert M. Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1662 days.

(21) Appl. No.: 11/439,395

(22) Filed: May 22, 2006

(65) Prior Publication Data
US 2007/0271561 A1 Nov. 22, 2007

(51) Int. Cl.
*G06F 9/455* (2006.01)
*G06F 9/44* (2006.01)

(52) U.S. Cl. ............................................ 718/1; 717/168
(58) Field of Classification Search ....... 718/1; 717/168
See application file for complete search history.

(56) References Cited

U.S. PATENT DOCUMENTS

| | | | |
|---|---|---|---|
| 7,356,679 B1* | 4/2008 | Le et al. ............................ 713/1 |
| 2002/0100036 A1* | 7/2002 | Moshir et al. ................. 717/173 |
| 2005/0257206 A1* | 11/2005 | Semerdzhiev ................. 717/168 |
| 2006/0005245 A1* | 1/2006 | Durham et al. .................. 726/25 |
| 2006/0184937 A1* | 8/2006 | Abels et al. ........................ 718/1 |
| 2007/0234331 A1* | 10/2007 | Schow et al. ................. 717/168 |
| 2007/0234356 A1* | 10/2007 | Martins et al. ..................... 718/1 |

OTHER PUBLICATIONS

Kozuch, Michael, et al. "Enterprise Client Management with Internew Suspend/Resume", Intel Technology Journal, vol. 8, Iss. 4, pp. 313-323, Nov. 17, 2004.*

* cited by examiner

*Primary Examiner* — Meng An
*Assistant Examiner* — Brian Chew
(74) *Attorney, Agent, or Firm* — Woodcock Washburn LLP

(57) ABSTRACT

Each of a plurality of virtual machines (VMs) is stored in a halted form in a library for retrieval from the library and re-starting on a host. Each re-started VM includes a plurality of software constructs, each of which is at least potentially non-current and requires a software update. To update a non-current VM, such VM is retrieved and re-started on a maintenance host, and each non-current software construct is allowed to be updated by obtaining the required software update from a corresponding update source as a patch. Alternatively, the VM is mounted to a computing device, constituent components of the mounted VM are examined to determine whether each software construct thereof is current, and each non-current software construct is updated by obtaining the required software update from the corresponding update source as a patch and applying same to the mounted VM.

20 Claims, 5 Drawing Sheets

UPDATING VIRTUAL MACHINE WITH PATCH ON HOST THAT DOES NOT HAVE NETWORK ACCESS

TECHNICAL FIELD

The present invention relates to updating a virtual machine or a component thereof with a patch to maintain the virtual machine or component. In particular, the present invention relates to a system and method that updates such a virtual machine in a library or the like and thus off-line. More particularly, the present invention relates to such a system and method that deploys the virtual machine from the library and into an on-line state to apply the patch, or that mounts the virtual machine in the manner of a drive with files to apply the patch.

BACKGROUND OF THE INVENTION

As should be appreciated, a virtual machine ('VM') is a software construct or the like operating on a computing device or the like (i.e., a 'host') for the purpose of emulating a hardware system. Typically, although not necessarily, the VM is an application or the like, and may be employed on the host to instantiate a use application or the like while at the same time isolating such use application from such host device or from other applications on such host. In one typical situation, the host can accommodate a plurality of deployed VMs, each VM performing some predetermined function by way of resources available from the host. Notably, each VM is for all intents and purposes a computing machine, although in virtual form, and thus represents itself as such both to the use application thereof and to the outside world.

Typically, although not necessarily, a host deploys each VM thereof in a separate partition. Such host may include a virtualization layer with a VM monitor or the like that acts as an overseer application or 'hypervisor', where the virtualization layer oversees and/or otherwise manages supervisory aspects of each VM of the host, and acts as a possible link between each VM and the outside world.

One hallmark of a VM is that the VM as a virtual construct can be halted and re-started at will, and also that the VM upon being halted can be stored and retrieved in the manner of a file or the like. In particular, the VM as instantiated on a particular computing device is a singular software construct that can be neatly packaged inasmuch as the software construct includes all data relating to such VM, including operating data and state information relating to the VM. As a result, a VM on a first host can be moved or 'migrated' to a second host by halting the VM at the first host, moving the halted VM to the second host, and re-starting the moved VM at the second host, or the like. More generally, a VM can be migrated from a first platform to a second platform in a similar manner, where the platforms represent different hosts, different configurations of the same host, or the like. In the latter case, and as should be appreciated, a computing device may have a different configuration if, for example, additional memory is added, a processor is changed, an additional input device is provided, a selection device is removed, etc.

In a similar manner, a library of VMs may be maintained, where each VM in the library is a halted and stored VM that is available to be retrieved and re-started upon appropriate command. Thus, and as one example, a user or the like in need of a particular processing scenario can peruse the library for an appropriate VM therein that addresses the scenario and upon finding such a VM can retrieve and re-start the VM. In a similar manner, a user or the like that has deployed a VM can at any appropriate point halt the VM and store the halted VM to the library for later retrieval, at which time the stored VM upon being retrieved from the library can be re-started to continue processing.

It should be understood that the VM includes an operating system, one or more use applications, and other various software constructs (i.e., 'software constructs', collectively), and that each software construct of the VM may from time to time require an update in the form of a patch or the like. As may be appreciated, such an update may be performed for any of several reasons, including to keep the construct current, to provide the construct with additional functionality, to address security issues with regard to the construct, or the like. Generally, the construct may include update functionality that periodically queries an update source for any new patches, and if available the update functionality obtains the new patches and installs same, perhaps with the aid and/or approval of a user or the like.

Notably, a VM that is halted and stored in a library or the like cannot perform any processing, and thus the update functionality of a construct of such a halted and stored VM is not able to obtain and install patches as may be appropriate. As may be appreciated, the inability of a construct to be updated while the VM thereof is halted and stored may be a minor inconvenience if the nature of the update is relatively insignificant, or may be a major issue if the nature of the update is relatively important. In the former case, an update that may be relatively insignificant could for example be an update that provides additional display features. In the latter case, an update that may be relatively important could for example be an update that addresses a security issue.

Especially with regard to an update that is relatively important, it may not be acceptable to wait to apply the update to a VM until some indeterminate time when the VM may be retrieved from the library and re-started in the normal manner. Accordingly, a need exists for a system and method directed toward allowing any updates and especially any important updates to be applied to a VM in a library.

SUMMARY OF THE INVENTION

The aforementioned need is satisfied by the present invention in which a system and method are provided with regard to a library of virtual machines (VMs) on a computing device. Each VM is stored in a halted form in such library for retrieval from the library and re-starting on a host computing device. Each VM in the library is a software construct that when re-started on a host computing device emulates a hardware system. Each re-started VM includes a plurality of software constructs. Each software construct of each VM in the library is at least potentially non-current and requires a software update.

In the method, for each VM in the library, it is periodically determined whether each software construct of the VM is current. If any software construct of the VM is not current, the VM is marked in the library as being non-current. At some point, a selection is received of a VM from the library to be retrieved and re-started on a host computing device. If the selected VM is marked in the library as being non-current, the VM is updated at a maintenance host computing device not having access to any host computing device, after which the updated VM is re-started at the host computing device.

To update the VM, such VM is retrieved from the library and re-started on the maintenance host computing device, and each non-current software construct of the re-started VM is allowed to be updated at the maintenance host computing device by obtaining the required software update from a corresponding update source as at least one patch. Alternatively, the VM is mounted to a computing device, constituent components of the mounted VM are examined to determine whether each software construct of the VM is current, and each non-current software construct is updated by obtaining the required software update from the corresponding update source as at least one patch and applying each patch to the mounted VM.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
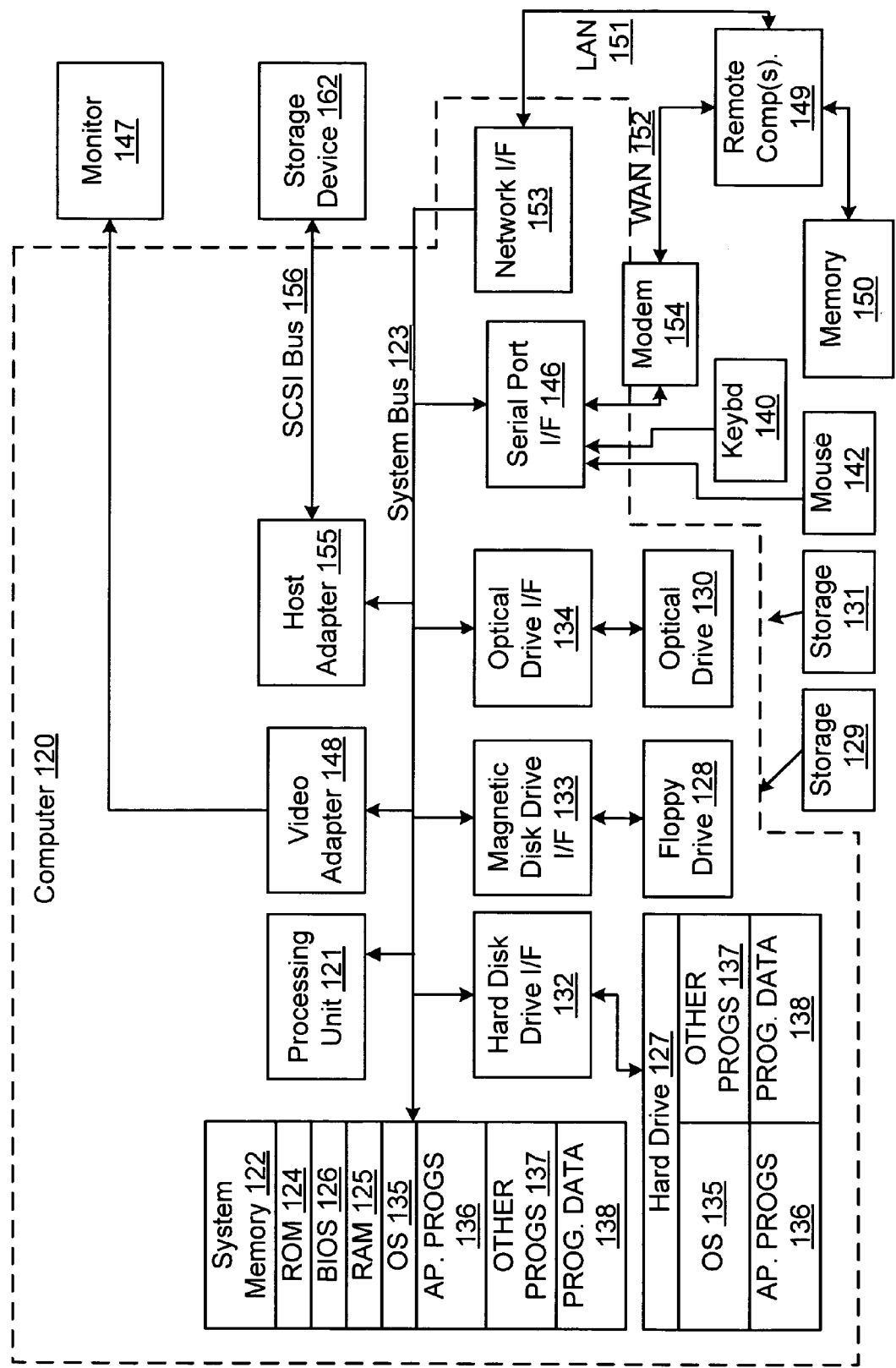
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Host and Virtual Machine Library

Figure 2:
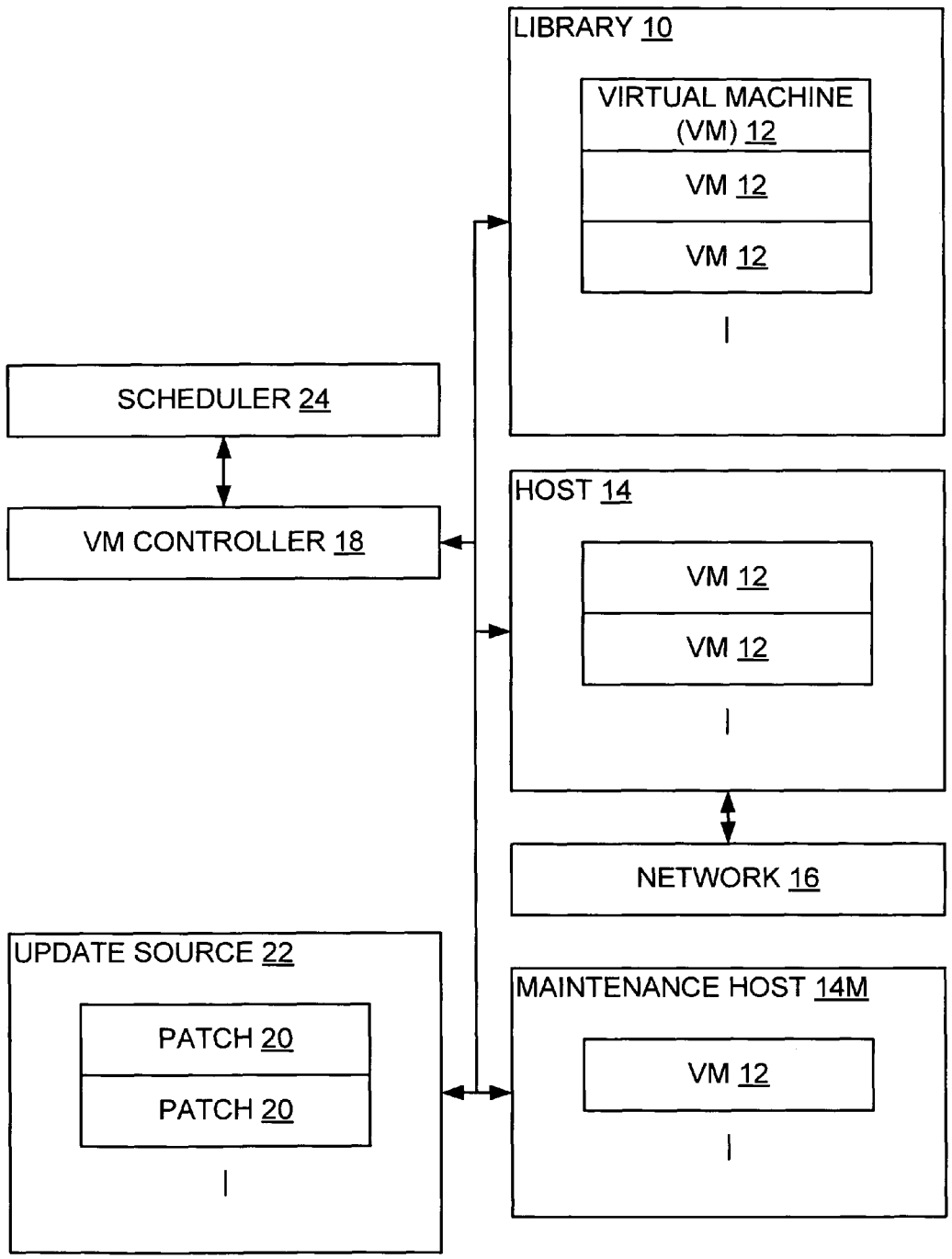
FIG. 2 is a block diagram showing a system with a library of virtual machines (VMs), each of which may be re-started at a maintenance host or mounted to a computing device for updating in accordance with embodiments of the present invention.

Turning now to FIG. 2, it seen that the present invention may have particular applicability in the context of a library 10 of virtual machines (VMs) 12, each of which is stored in a halted and most likely shut-down form in such library 10 and may be retrieved from the library 10 and re-started on a host 14 in an appropriate manner. Note here that the library 10, VMs 12, and host 14 may be any appropriate library, VMs, and host without departing from the spirit and scope of the present invention. Such a library, VMs, and host are known or should be apparent to the relevant public and therefore need not be set forth herein in any detail beyond that which is already provided.

As was set forth above, each VM 12 in the library 10 is a software construct or the like that when re-started on a host 14 emulates a hardware system. Thus, the VM 12 may employ the resources of the host 14 to instantiate a use application or the like while at the same time isolating such use application from such host 14 and other applications on such host 14. As shown, the host 14 may accommodate a plurality of deployed VMs 12, where each VM 12 independently performs some predetermined function. For example, at least some of the VMs 12 deployed on the host 14 may act as data servers, at least some of such VMs 12 may act as network servers with regard to a network 16 coupled to the host 14, at least some of such VMs 12 may act as mail servers, and at least some of such VMs 12 may perform low-level functions including maintenance functions, data collection, hardware monitoring, error correction, file management, and the like. Notably, each VM 12 is for all intents and purposes a computing machine, although in virtual form.

The host 14 itself may be an appropriate computing device such as a desktop computer, a laptop computer, a handheld computer, a data assistant, a mainframe computer, or any other type of computing device with the functionality and capacity necessary to host one or more of the VMs 12. Bearing in mind that each VM may require significant memory, I/O operations, storage space, and processor capacity from the host 14, however, and also bearing in mind that the host 14 may be expected to accommodate 2, 5, 10, 20 or more of the VMs 12 at any one time, the host 14 likely should have significant power and resources to be able to in fact accommodate such VMs 12.

The library 10 may be any sort of library on any sort of computing device without departing from the spirit and scope of the present invention. For example, the library 10 may reside on a server of sufficient capacity to hold all of the VMs 12 of such library 10, or may simply reside on an appropriate disk drive of such sufficient capacity. In the latter case, the disk drive may even be part of the host 14. Note, though, that in the case where there are multiple available hosts 14, such library 10 is likely physically separate from but communicatively coupled to such hosts 14. Conceivably, the library 10 could itself reside on a virtual machine.

As was noted above, each VM 12 as a virtual construct can be halted and re-started at will, and upon being halted can be stored in the library 10 and retrieved therefrom in the manner of a file or the like. In particular, each VM 12 is a singular software construct that can be neatly packaged inasmuch as the software construct includes all data relating to such VM 12, including operating data and state information relating to the VM 12. Thus, a VM 12 on a first host 14 can be moved or 'migrated' among hosts 14 simply by halting the VM 12 at a first host 14, moving the halted VM 12 to a second host 14, and re-starting the moved VM 12 at the second host 14.

Typically, although not necessarily, the system of FIG. 2 includes a VM controller 18 operating on an appropriate computing device or the like. Principally, and as may be appreciated, such VM controller 18 is operated to retrieve a stored VM 12 from the library 10 and deploy the retrieved VM 12 by re-starting same on a particular host 14, and also to halt the deployed VM 12 and store the halted VM 12 at the library 10, all at the appropriate direction of a user or the like. Thus, a user or the like in need of a particular processing scenario can peruse the library 10 by way of the VM controller 18 for an appropriate VM 12 that addresses the scenario and upon finding such a VM 12 the user can employ the VM controller 18 to retrieve and re-start the VM 12. In a similar manner, a user or the like that has deployed a VM can at any appropriate point halt the VM and store the halted VM to the library for later retrieval, at which time the stored VM upon being retrieved from the library can be re-started to continue processing. Note here that the VM controller 18 may be any appropriate VM controller without departing from the spirit and scope of the present invention. Such a VM controller 18 is known or should be apparent to the relevant public and therefore need not be set forth herein in any detail beyond that which is already provided.

Updating with Patches

As was noted above, each VM 12 in the library 10 is itself a software construct in a physical sense, but in a virtual sense the VM 12 itself includes a plurality of software constructs including an operating system with a registry or the like, one or more use applications, various device drivers and device libraries, and the like (i.e., 'software constructs', collectively). Notably, each software construct of any VM 12 may from time to time require a software update in the form of a patch or the like. Such a software update in the form of a patch 20 or the like is known or should be apparent to the relevant public, and therefore need not be set forth herein in any detail. As may be appreciated, such an update may be performed for any of several reasons, including to keep the software construct current, to provide the construct with additional functionality, to address security issues with regard to the construct, or the like. Accordingly, the present invention may operate without regard to any particular software update or patch 20 (hereinafter, 'patch 20') or type thereof.

Generally, a patch 20 may be applied to a software construct such as that of a VM 12 in an at least partially automated manner. As such, the construct may include update functionality that periodically queries one or more update sources 22 for any new patches 20, and if available the update functionality obtains each new patch 20 from the update source 22 and installs same, perhaps with the aid and/or approval of a user or the like. Update functionality in connection with a construct or the like is known or should be apparent to the relevant public, and therefore need not be set forth herein in any detail. Accordingly, the present invention may operate without regard to any particular update functionality.

Note, though, that for update functionality of any particular construct of a VM 12 to operate, the VM 12 itself must be deployed and operating. Put another way, a VM that is halted and stored in a library or the like cannot perform any processing, and thus the update functionality of a construct of such a halted and stored VM is not able to obtain and install a patch 20 from the update source 22. To summarize, then, a software construct of a VM 12 that is resident in the library 10 cannot be updated. As a result, the software construct must in effect wait to be updated until the VM 12 is retrieved from the library 10 and re-started on a host 14.

Note, though, that it may very well be the case that a significant update such as a security update is issued with regard to a particular construct of a VM 12 stored in the library 10. In such a situation, the VM 12 is not protected from a security threat that the security update is intended to protect against, and thus should not be deployed to any host 14 with the construct in such an unprotected state. In particular, and especially if the host 14 has access to any network such as the network 16, deploying such an unprotected VM 12 could allow any of a host of serious security situations to occur, including a security breach of the network 16, the host 14, other hosts 14 on the network 16, and the like.

Thus, and referring still to FIG. 2, and in one embodiment of the present invention, the VM controller 18 deploys the VM 12 to a maintenance host 14m, where the maintenance host 14m has access to the update source 22 by way of an appropriate communicative coupling, but does not have access to any host 14 by way of the network 16 or otherwise. In particular, and referring now to FIG. 3, the VM controller 18 may operate based on a scheduler 24 (FIG. 2) to periodically deploy each of one or more VMs 12 to the maintenance host 14m for updating (step 301). As may now be appreciated, at the maintenance host 14m, one or more of the software constructs of each deployed VM 12 are updated with appropriately obtained patches 20 (step 305), after which the updated VM 12 is halted and stored at the library 10 in the updated form to await the next deployment at a host 14 (step 307). The software constructs of the deployed VM 12 may be updated based on processes triggered by such software constructs (step 303a), or may be updated based on processes triggered by the VM controller 18 (step 303b). In the latter case, the VM controller 18 may employ appropriate known interfaces to effectuate such triggering.

Note here that scheduler 24 may be any appropriate scheduler, such as for example a task scheduler that is part of the VM controller 18, and may schedule each VM 12 for updating based on any appropriate criteria without departing from the spirit and scope of the present invention. For example, the scheduler 24 may operate to cause the VM controller 18 to deploy each VM 12 to the maintenance host 14m once every week, once every two weeks, and the like. Such a scheduler and such scheduling is known or should be apparent to the relevant public and therefore need not be set forth herein in any detail. Note too that the maintenance host 14m may be any appropriate host without departing from the spirit and scope of the present invention, subject to the requirement that the maintenance host isolates or otherwise quarantines each deployed VM 12 thereon from other hosts 14 and only allows access to the update source 22.

Figure 3:
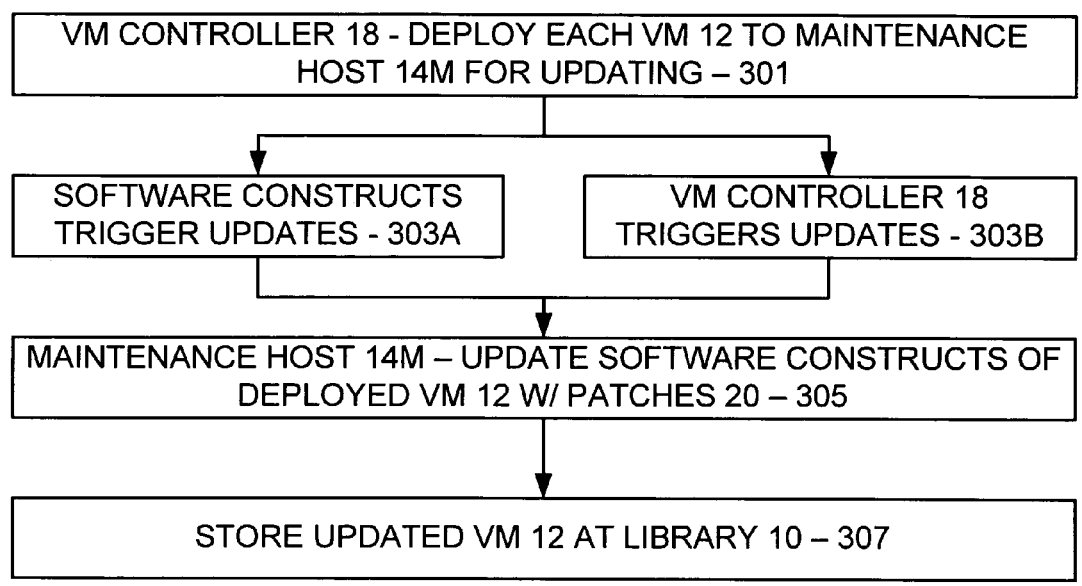
FIGS. 3-5 are flow diagrams showing key steps performed in connection with the system of FIG. 2 in accordance with embodiments of the present invention.

As may be appreciated, the VM controller 18 operating in the manner shown in FIG. 3 based on the scheduler 24 of FIG. 2 is somewhat inefficient in that each VM 12 is deployed at the maintenance host 14m without regard for whether updates are required for the VM 12. Accordingly, and in one embodiment of the present invention, and turning now to FIG. 4, rather than initially deploying each scheduled VM 12 to the maintenance host 14m, the VM controller 18 instead mounts the VM 12 to a computing device such as the maintenance host 14m, the library 10 or the like such that the constituent components of the VM 12 may be examined (step 401). Mounting such VM 12 to examine same is known or should be apparent to the relevant public and therefore need not be set forth herein in any detail. Accordingly, any particular form of mounting may be performed without departing from the spirit and scope of the present invention. For example, such VM 12 may be mounted such that the constituent components thereof can be examined in the manner of a disk drive or the like having a plurality of files or the like.

As mounted, then, the VM controller 18 may examine various parts of the VM 12 to determine whether various constructs of the VM 12 are current (step 403). In particular, and as may be appreciated, such a determination may be made by the VM controller 18 by reviewing information from the mounted VM 12 such as file versions, registry information, and other data that is typically employed to determine whether updating with one or more patches 20 is required. Presuming that one or more patches 20 are indeed required, the VM controller 18 may then effectuate obtaining each such patch 20 from an appropriate update source 22 (step 405) and applying same to the VM 12. Notably, such patches 20 may be applied either to the VM 12 as mounted (step 407a), or if necessary to the VM 12 as deployed on the maintenance host 14m (step 407b).

In the former case as at step 407a, the VM controller 18 would apply each patch 20 by file substitution on the mounted VM 12, file modification, and the like. Any necessary registry modifications may be performed by locating the registry hive file on the mounted VM 12 and then loading the located registry hive on the maintenance host 14m, library 10, or the like, modifying the loaded hive, and saving the modified hive as a replacement for the corresponding located hive. In the latter case as at step 407b, the VM controller 18 would first dis-mount the VM 12 from the maintenance host 14m or the like and then deploy same on such maintenance host 14m. Finally, after the VM 12 has been updated with all required patches 20, the VM controller 18 may then move the updated VM 12 back to the library 10, either by dis-mounting the VM 12 from the maintenance host 14m or the like and storing the dis-mounted VM 12 in the library 10 (step 409a), or by halting the deployed VM 12 and storing the halted VM 12 in the library 10 (step 409b).

Figure 4:
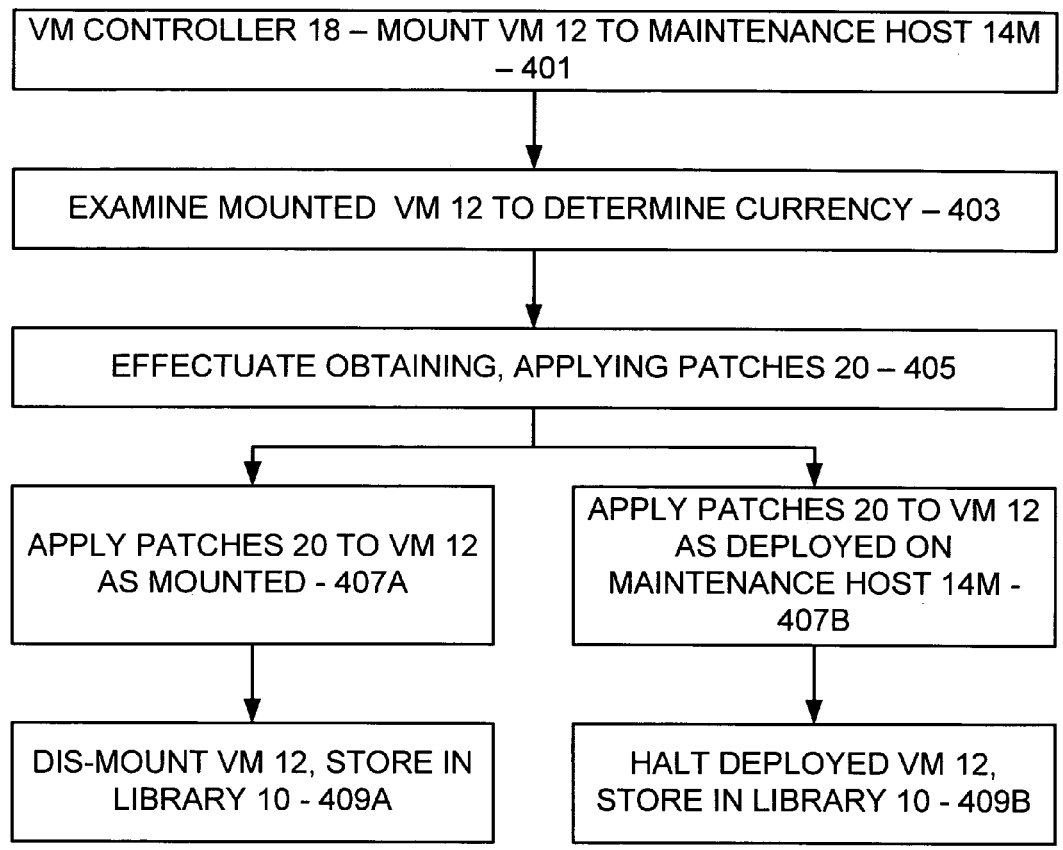
Figure 5:
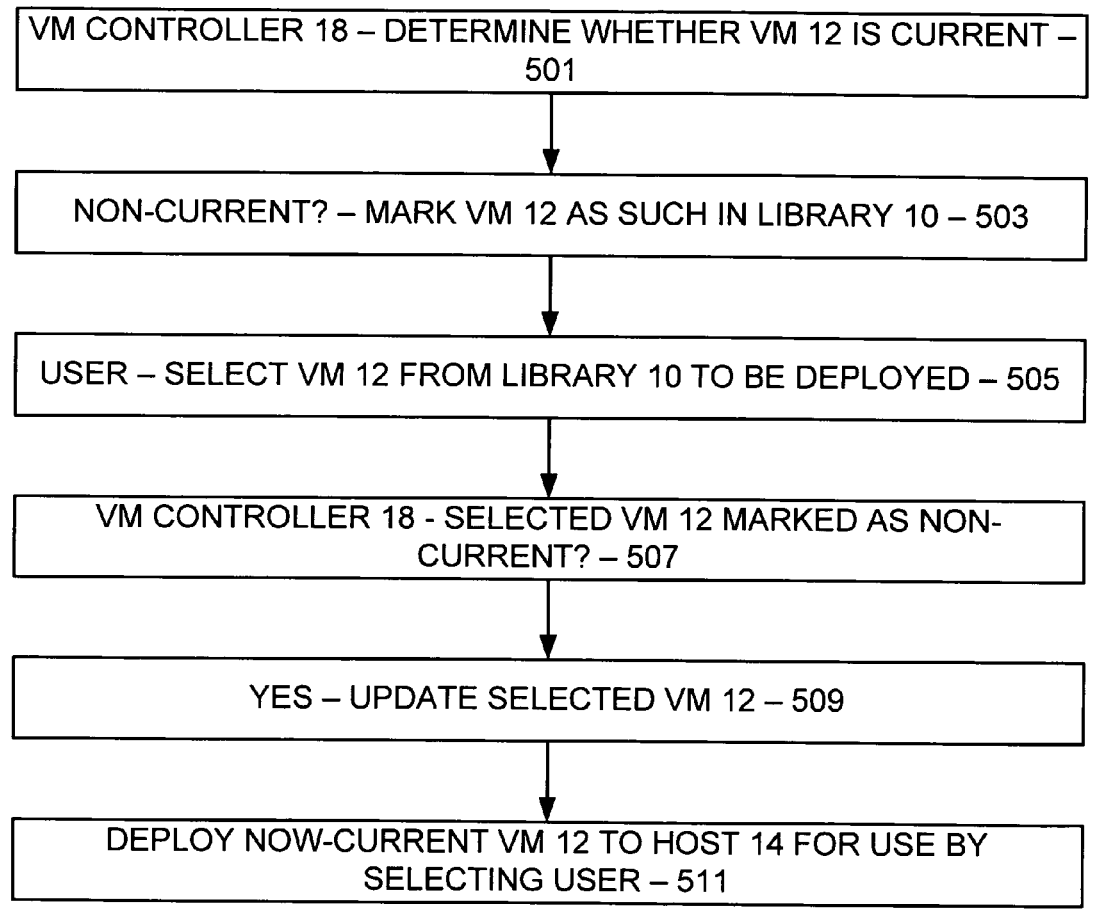

As may be appreciated, the VM controller 18 operating in the manner shown in FIG. 4 can at times be inefficient in that each VM 12 is updated without regard for whether the VM 12 is going to be employed by the user or the like. That is, each VM 12 is updated even if the VM 12 is seldom if ever deployed. Accordingly, and in one embodiment of the present invention, and turning now to FIG. 5, rather than actually updating each non-current VM 12, the VM controller instead marks the VM 12 as being non-current, and the VM 12 is in fact updated only prior to be actually deployed. In particular, and as before, the VM controller 18 determines whether each scheduled VM 12 is current (step 501), by for example mounting the VM 12 such that the constituent components of the VM 12 may be examined, as at step 401. Here, though, each non-current VM 12 is marked as such in an appropriate manner (step 503), by for example including an appropriate notation with the VM 12 in the library 10. Thus, when a user selects each VM 12 from the library 10 to be deployed (step 505), the VM controller 18 first checks whether the selected VM 12 is marked as non-current (step 507). If non-current, the VM 12 is first deployed or mounted to the maintenance host 14m and updated as at steps 301 et seq. or 401 et seq. (step 509), after which the now-current VM 12 is deployed to a host 14 for use by the selecting user (step 511).

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful system and method for applying an update to a VM 12 that is stored in a library 10. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method for use in a computing system, the computing system comprising a host computing device coupled to a network, a library which does not have access to the network, and a maintenance host computing device which does not have access to the network, wherein the network may pose a security risk to the host computing device and any virtual machine (VM) deployed on the host computing device, the method comprising:
    storing a VM in a halted form in the library;
    retrieving the VM from the library;
    re-starting the VM on the maintenance host computing device;
    updating each non-current software construct of the re-started VM at the maintenance host computing device by obtaining the required software update from a corresponding update source as at least one patch;
    halting the updated VM and storing the halted updated VM at the library; to await retrieval and
    re-starting the updated VM at the host computing device.

2. The method of claim 1, further comprising externally triggering each non-current software construct of the re-started VM to be updated.

3. The method of claim 1, wherein each non-current software construct of the re-started VM is configured to internally trigger itself to be updated.

4. The method of claim 1, wherein the computing system further comprises a VM controller, and wherein the VM controller is configured to retrieve the VM from the library, to re-start the retrieved VM on the maintenance host computing device, and to halt the re-started VM and store the halted updated VM at the library.

5. The method of claim 4, wherein the VM controller is configured to periodically re-start each VM of the library at the maintenance host computing device for updating based on a scheduler.

6. The method of claim 1, further comprising periodically re-starting each VM of the library at the maintenance host computing device for updating based on a scheduler.

7. The method of claim 1, wherein the VM is retrieved from the library on a periodic basis.

8. The method of claim 1, further comprising:
    periodically determining whether any software construct of the VM is not current;
    wherein the VM is re-started on the host maintenance computing device in response to the periodically determining resulting in a determination that any software construct of the VM is not current.

9. A method for use in a computing system, the computing system comprising a host computing device coupled to a network, a library which does not have access to the network, and a maintenance host computing device which does not have access to the network, wherein the network which may pose a security risk to the host computing device and any virtual machine (VM) deployed on the host computing device, the method comprising:
    storing a VM in a halted form in the library;
    retrieving the VM from the library on a periodic basis;
    mounting the retrieved VM to the maintenance host computing device;
    examining constituent components of the mounted VM to determine whether each software construct of the VM is current, and for each non-current software construct updating the non-current software construct at the computing device by obtaining the required software update from a corresponding update source as at least one patch and applying each patch to the mounted VM;
    storing the updated VM at the library; and
    re-starting the updated VM at the host computing device.

10. The method of claim 9, further comprising:
    applying each patch to the non-current software construct while the VM is mounted to the maintenance host computing device; and
    storing the updated VM at the library after dis-mounting the updated VM from the computing device.

11. The method of claim 9, further comprising:
    applying each patch to the non-current software construct at the maintenance host computing device;
    dis-mounting the VM from the computing device and then re-starting the VM on the maintenance host computing device; and
    storing the updated VM at the library after halting the updated VM at the maintenance host computing device.

12. The method of claim 9, further comprising mounting the retrieved VM to the maintenance host computing device such that the constituent components of the mounted VM can be examined in the manner of a disk drive having a plurality of files.

13. The method of claim 9, wherein examining the constituent components of the mounted VM comprises reviewing information from the mounted VM including file versions.

14. The method of claim 9, wherein the computing system further comprises a VM controller, and wherein the VM controller is configured to retrieve the VM from the library, to mount the retrieved VM to the maintenance host computing device, and to store the updated VM at the library.

15. The method of claim 14, wherein the VM controller is configured to periodically re-start each VM of the library at the maintenance host computing device for updating based on a scheduler.

16. The method of claim 9, further comprising periodically re-starting each VM of the library at the maintenance host computing device for updating based on a scheduler.

17. A system for updating a plurality of virtual machines (VMs), comprising:
    a host computing device coupled to a network, the host computing device configured to accommodate one or more deployed VMs, wherein the network may pose a security risk to the host computing device and any VM deployed on the host computing device;
    a library which does not have access to the network, the library configured to store a plurality of VMs in a halted form;
    a maintenance host computing device which does not have access to the network, the host maintenance computing device configured to accommodate one or more deployed VMs; and
    a virtual machine controller configured to:
        retrieve a VM from the library,
        re-start the VM on the maintenance host computing device, update each non-current software construct of the VM while re-started on the host maintenance controller with a software update, halt the updated VM, store the halted updated VM in the library, and re-start the updated VM on the host computing device.

18. The system of claim 17, wherein the VM controller is configured to periodically retrieve the VM from the library and re-start the VM of the library at the maintenance host computing device for updating.

19. The system of claim 17, wherein the VM controller is configured to retrieve the VM from the library and re-start the VM of the library at the maintenance host computing device for updating based on a scheduler.

20. The system of claim 17, further comprising:

an update source comprising a plurality of software updates, wherein the virtual machine controller is configured to retrieve the software update from the plurality of software updates in the update source.

* * * * *